United States Patent
Miller et al.

(10) Patent No.: US 12,521,710 B2
(45) Date of Patent: Jan. 13, 2026

(54) SYSTEM AND METHOD FOR REGENERATING AND RESTORING KINETIC PROPERTIES OF RESIN

(71) Applicant: IONX SOLUTIONS, LLC, Glendale, AZ (US)

(72) Inventors: Thomas O. Miller, Peoria, AZ (US); Jared T. Miller, Peoria, AZ (US)

(73) Assignee: IONX SOLUTIONS, LLC, Glendale, AZ (US)

( * ) Notice: Subject to any disclaimer, the term of this patent is extended or adjusted under 35 U.S.C. 154(b) by 370 days.

(21) Appl. No.: 18/261,107

(22) PCT Filed: Jan. 11, 2022

(86) PCT No.: PCT/US2022/012052
§ 371 (c)(1),
(2) Date: Jul. 11, 2023

(87) PCT Pub. No.: WO2022/155160
PCT Pub. Date: Jul. 21, 2022

(65) Prior Publication Data
US 2024/0100515 A1 Mar. 28, 2024

Related U.S. Application Data

(60) Provisional application No. 63/136,476, filed on Jan. 12, 2021.

(51) Int. Cl.
*B01J 49/85* (2017.01)
*B01J 4/00* (2006.01)
*B01J 47/022* (2017.01)

(52) U.S. Cl.
CPC .............. *B01J 49/85* (2017.01); *B01J 4/001* (2013.01); *B01J 47/022* (2013.01)

(58) Field of Classification Search
CPC ........... B01J 49/85; B01J 4/001; B01J 47/022
(Continued)

(56) References Cited

U.S. PATENT DOCUMENTS

| 3,116,241 A | 12/1963 | Howle |
| 3,139,401 A | 6/1964 | Hach |

(Continued)

FOREIGN PATENT DOCUMENTS

| GB | 1054578 A | 1/1967 |
| JP | 2002159867 | 6/2002 |

(Continued)

*Primary Examiner* — Ekandra S. Miller-Cruz
(74) *Attorney, Agent, or Firm* — FULLER IP LAW LLC; Rodney J. Fuller

(57) ABSTRACT

A cleaning system configured to clean and regenerate resin is disclosed, including a vessel and a draw chamber having a separation screen disposed inside the bottom of the vessel. The system also includes an eductor, a plenum discharging at the top of the vessel, and a fouled/exhausted resin. The system includes a first resin regeneration chemical flowing into the vessel, and a sulfite solution circulating through the eductor into the vessel along with the resin. The system includes a scrubber module having at least one helical pathway having a conduit rotating about and propagating along an axis with a pitch. The helical pathway includes a pathway inlet in fluid communication with the bottom of the vessel and a pathway outlet in fluid communication with the top of the vessel. Resin is recirculated throughout the vessel as the separation screen and the sulfite solution work together to clean the resin.

20 Claims, 10 Drawing Sheets

(58) Field of Classification Search
USPC .......................................................... 210/675
See application file for complete search history.

(56) References Cited

U.S. PATENT DOCUMENTS

| | | | |
|---|---|---|---|
| 3,749,249 | A | 7/1973 | Ryan |
| 4,220,531 | A | 9/1980 | Robison |
| 4,500,430 | A | 2/1985 | Dasgupta |
| 4,511,675 | A | 4/1985 | Auerswald |
| 4,880,513 | A | 11/1989 | Davis |
| 4,913,803 | A | 4/1990 | Earls |
| 5,082,567 | A | 1/1992 | Fritts |
| 5,368,818 | A | 11/1994 | Cummings |
| 5,858,119 | A | 1/1999 | Mayne |
| 7,482,387 | B2 | 1/2009 | Huang |
| 8,585,906 | B2 | 11/2013 | Jessen |
| 8,870,445 | B2 | 10/2014 | Burns, II |
| 9,186,665 | B2 | 11/2015 | Jessen |
| 9,809,739 | B2 | 11/2017 | Shown |
| 10,532,351 | B1 | 1/2020 | Miller |
| 11,433,387 | B2 | 9/2022 | Miller |
| 2011/0077144 | A1 | 3/2011 | Jessen |
| 2012/0283343 | A1 | 11/2012 | Carson et al. |
| 2012/0312751 | A1 | 12/2012 | Chandler, Jr. |
| 2013/0037477 | A1 | 2/2013 | Parke |
| 2013/0146086 | A1 | 6/2013 | Everson |
| 2014/0196753 | A1 | 7/2014 | Jessen |
| 2014/0263008 | A1 | 9/2014 | Barker |
| 2016/0137532 | A1 | 5/2016 | Slough |
| 2016/0354736 | A1 | 12/2016 | Young |
| 2020/0070143 | A1 | 3/2020 | Miller |

FOREIGN PATENT DOCUMENTS

| | | |
|---|---|---|
| JP | 2013139028 | 7/2013 |
| JP | 2016093779 | 5/2016 |
| WO | 2015143538 | 10/2015 |

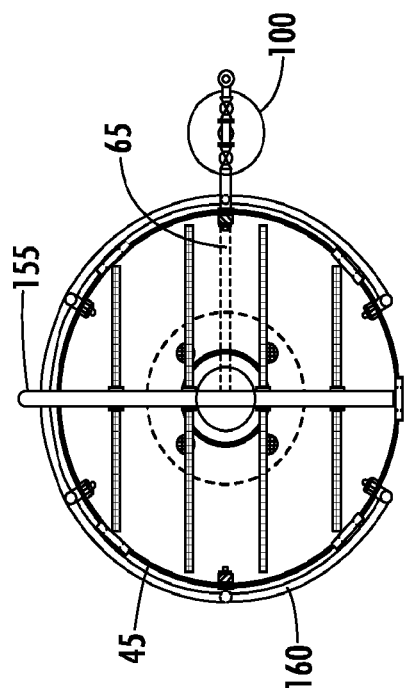
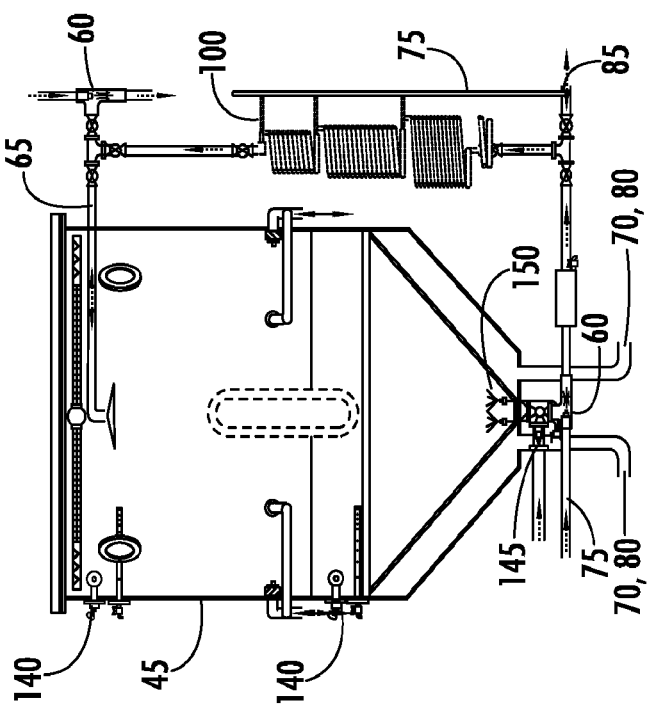
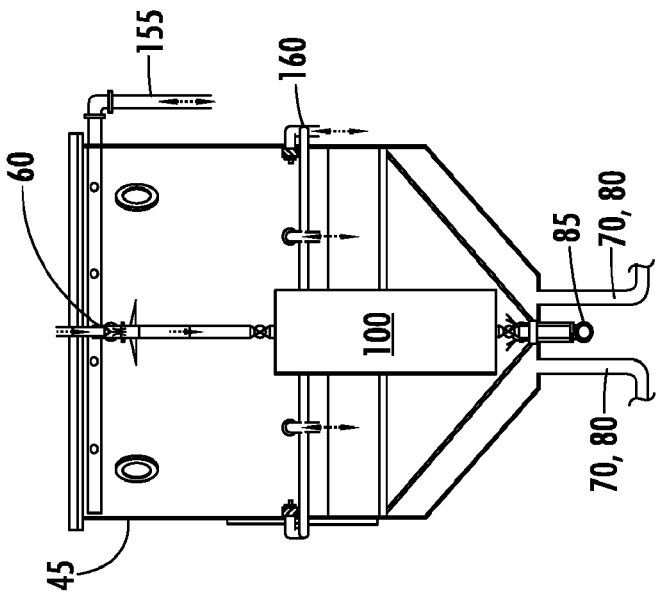

SYSTEM AND METHOD FOR REGENERATING AND RESTORING KINETIC PROPERTIES OF RESIN

RELATED APPLICATIONS

This application is the U.S. National Stage of International Patent Application No. PCT/US2022/012052, filed on Jan. 11, 2022, which claims the benefit of and priority to U.S. provisional patent application 63/136,476, filed Jan. 12, 2021, the contents of each of which are incorporated herein by reference in their entireties.

TECHNICAL FIELD

Aspects of this document relate generally to the field of cleansing and purifying ion exchange resins, and more specifically relates to a system and method by which resins, such as ion exchange resin, may be cleaned of impurities and regenerated in an expeditious and efficient manner, and kinetics of the ion exchange resin are fully restored.

BACKGROUND

It is known that power plants and other industries utilize ion exchange resins to purify water used in producing steam. The rate at which ion exchange occurs at exchange sites on resin is referred to as ion exchange kinetics, and is expressed as the mass transfer coefficient (MTC), or the speed at which an exchange site on a resin bead removes ionic impurities from service water through polar attraction. Excellent resin kinetics implies the resin is able to attract and remove impurities before the water carries them past ion exchange sites, and can be summarized as, "The better the kinetic properties are on resin, the higher the quality of effluent waters it will produce." Organic materials and iron oxides adhering to the surface of resins can block exchange sites, slowing the ability of the resin to attract and remove impurities. Blocking exchange sites on resin surfaces results in higher levels of impurities remaining in effluent waters.

To control corrosion rates in plant equipment, the power industry elevates the pH of process waters with various organic amines. Organic additives chemically break down in regions of high temperatures. The resulting decomposition products are captured on surfaces of ion exchange resins, causing the resins to become fouled.

It has recently been determined that decomposition products of pH control additives such as Monoethanolamine (ETA/MEA) are captured on resins as both, positively and negatively charged anions, resulting in ETA/MEA organic complexes. Current resin regeneration processes are unable to effectively remove anionic ETA, or organic and iron oxide foulants from resin surfaces, rendering anion resins incapable of performing ion exchange. Degraded kinetic properties due to organic fouling, results in increased chloride, sulfate and silica slippage from ion exchangers during service runs. Impurities in industrial feedwaters challenge chemistry goals designed to minimize corrosion. Typically, kinetically fouled resin must be removed from service, discarded, and replaced with new.

Replacing resin charges is extremely costly, and if discarded resin is contaminated with detectible isotopic activity (nuclear power) the cost to bury as radwaste significantly increases replacement costs. Previously, no known acceptably safe or effective method has existed for removing organic fouling and iron oxides from the surface of resin beads.

The increasing demands in the utility sector to lower feedwater impurities as a result of resin maintenance activities are well documented gaps in maintaining health and readiness of condensate polishing resins. Conventional regeneration methods are unable to maintain ion exchange kinetics on polisher resins.

Few solutions to this issue can be found in prior art. For example, sodium bisulfite has been proposed as a solution for removing rust from water softeners, as taught by Hatch (U.S. Pat. No. 3,139,401). Other resin regeneration chemicals have been previously patented for their anion/cation resin separation properties, but the scope of the application as taught by Auerswald (U.S. Pat. No. 4,511,675) is limited.

SUMMARY

According to one aspect, a cleaning system configured to clean and regenerate kinetic and ion exchange properties of resin includes a vessel having a bottom, at least one solution inlet, at least one waste outlet, at least one resin inlet, and at least one resin outlet. The system also includes a draw chamber disposed inside the bottom of the vessel. The draw chamber has a separation screen. The system further includes at least one eductor, a plenum in fluid communication with the at least one eductor, discharging at a top of the vessel, and a fouled/exhausted resin having at least one resin. Each resin of the at least one resin is one of cationic and anionic in nature. The system includes a first resin regeneration chemical flowing through the at least one eductor into the vessel. The first resin regeneration chemical is a chemical regeneration solution for one of cation resins and anion resins. The system also includes a sulfite solution circulating through the at least one eductor into the vessel along with the fouled/exhausted resin, the sulfite solution performing a reducing reaction. The system includes a scrubber module having at least three helical pathways configured to convey the resin with a velocity, each helical pathway having a conduit rotating about and propagating along an axis with a pitch. The at least three helical pathways are coupled in series such that the bottom of the vessel is in fluid communication with the top of the vessel through all of the helical pathways. Each helical pathway is in fluid communication with a subsequent helical pathway. The three helical pathways together have a pathway inlet in fluid communication with the bottom of the vessel through the eductor and a pathway outlet in fluid communication with the top of the vessel. The at least one eductor is configured to recirculate resin throughout the vessel as the separation screen and the sulfite solution work together to remove at least one of organics, iron oxides, waste, and debris from the resin.

Particular embodiments may comprise one or more of the following features. Each helical pathway of the at least three helical pathways of the scrubber module may include a booster eductor coupled to one of the pathway inlet and the pathway outlet of the helical pathway, and may be further coupled to an eductor motive feed. The booster eductor may be configured to draw resin through the pathway inlet, through the conduit, and out the pathway outlet toward the top of the vessel. The conduit of the helical pathway may be formed from a spiral flighting coupled to the inside of the plenum. The conduit may include a coiled pipe. The system may further include a plurality of scrubber modules. Moving from the helical pathway closest to the bottom of the vessel to the helical pathway closest to the top of the vessel, a pathway radius of each helical pathway may get progressively smaller. At least two helical pathways may have pathway radii that are substantially equal.

According to another aspect of the disclosure, a cleaning system configured to clean and regenerate kinetic and ion exchange properties of resin includes a vessel having a bottom, at least one solution inlet, at least one waste outlet, at least one resin inlet, and at least one resin outlet. The system also includes a draw chamber disposed inside the bottom of the vessel, the draw chamber having a separation screen. The system further includes at least one eductor, a plenum in fluid communication with the at least one eductor, discharging at a top of the vessel, and a fouled/exhausted resin having at least one resin, each resin of the at least one resin being one of cationic and anionic in nature. The system includes a first resin regeneration chemical flowing through the at least one eductor into the vessel. The first resin regeneration chemical is a chemical regeneration solution for one of cation resins and anion resins. The system includes a sulfite solution circulating through the at least one eductor into the vessel along with the fouled/exhausted resin, the sulfite solution performing a reducing reaction. The system also includes a scrubber module having at least one helical pathway configured to convey the resin with a velocity, the helical pathway having a conduit rotating about and propagating along an axis with a pitch. The helical pathway includes a pathway inlet in fluid communication with the bottom of the vessel through the eductor and a pathway outlet in fluid communication with the top of the vessel. The at least one eductor is configured to recirculate resin throughout the vessel as the separation screen and the sulfite solution work together to remove at least one of organics, iron oxides, waste, and debris from the resin.

Particular embodiments may comprise one or more of the following features. Each helical pathway of the at least one helical pathways of the scrubber module may include a booster eductor coupled to one of the pathway inlet and the pathway outlet of the helical pathway, and may be further coupled to an eductor motive feed. The booster eductor may be configured to draw resin through the pathway inlet, through the conduit, and out the pathway outlet toward the top of the vessel. The conduit of the helical pathway may be formed from a spiral flighting coupled to the inside of the plenum. The conduit may include a coiled pipe. The scrubber module may include a plurality of helical pathways that are coupled in series such that the bottom of the vessel may be in fluid communication with the top of the vessel through all of the helical pathways. Each helical pathway may be in fluid communication with a subsequent helical pathway through a booster eductor. Moving from the helical pathway closest to the bottom of the vessel to the helical pathway closest to the top of the vessel, a pathway radius of each helical pathway may get progressively smaller. At least two helical pathways may have pathway radii that are substantially equal. The sulfite solution may convert to sulfate as part of a reducing reaction to clean resins prior to the introduction of the first resin regeneration chemical. The sulfite solution may convert to sulfate as part of a reducing reaction to clean resins prior to the introduction of a second resin regeneration chemical flowing through the at least one eductor into the vessel. The second resin regeneration chemical may be a chemical regeneration solution for one of cation resins and anion resins. The sulfite solution may be catalyzed and configured to deconstruct and remove organic and metal oxide materials adhered to resin surfaces. The scrubber module may be located outside of the vessel. The at least one eductor may be disposed internally to the vessel. The vessel may be configured to be at least one of sealed, pressurized, and filled with at least one of water and sulfite solution, to prevent introduction of free oxygen to the vessel.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIGS. 8A-C are top, front, and side cross-sectional views of a vertical cleaning vessel (45) having a scrubber module (100) external to the vessel.

DETAILED DESCRIPTION

Figure 1:
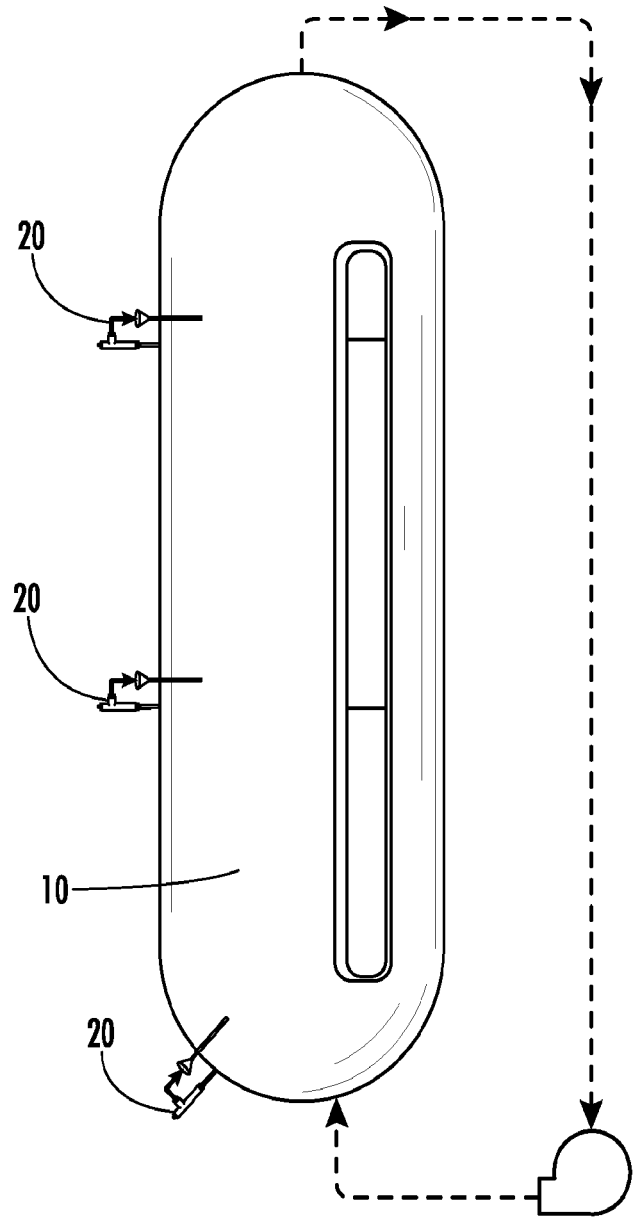
FIG. 1 depicts an overview perspective of a conventional cleaning vessel (10) and cleaning vessels employed in the process and system of the present invention (45)(50)
Figure 2:
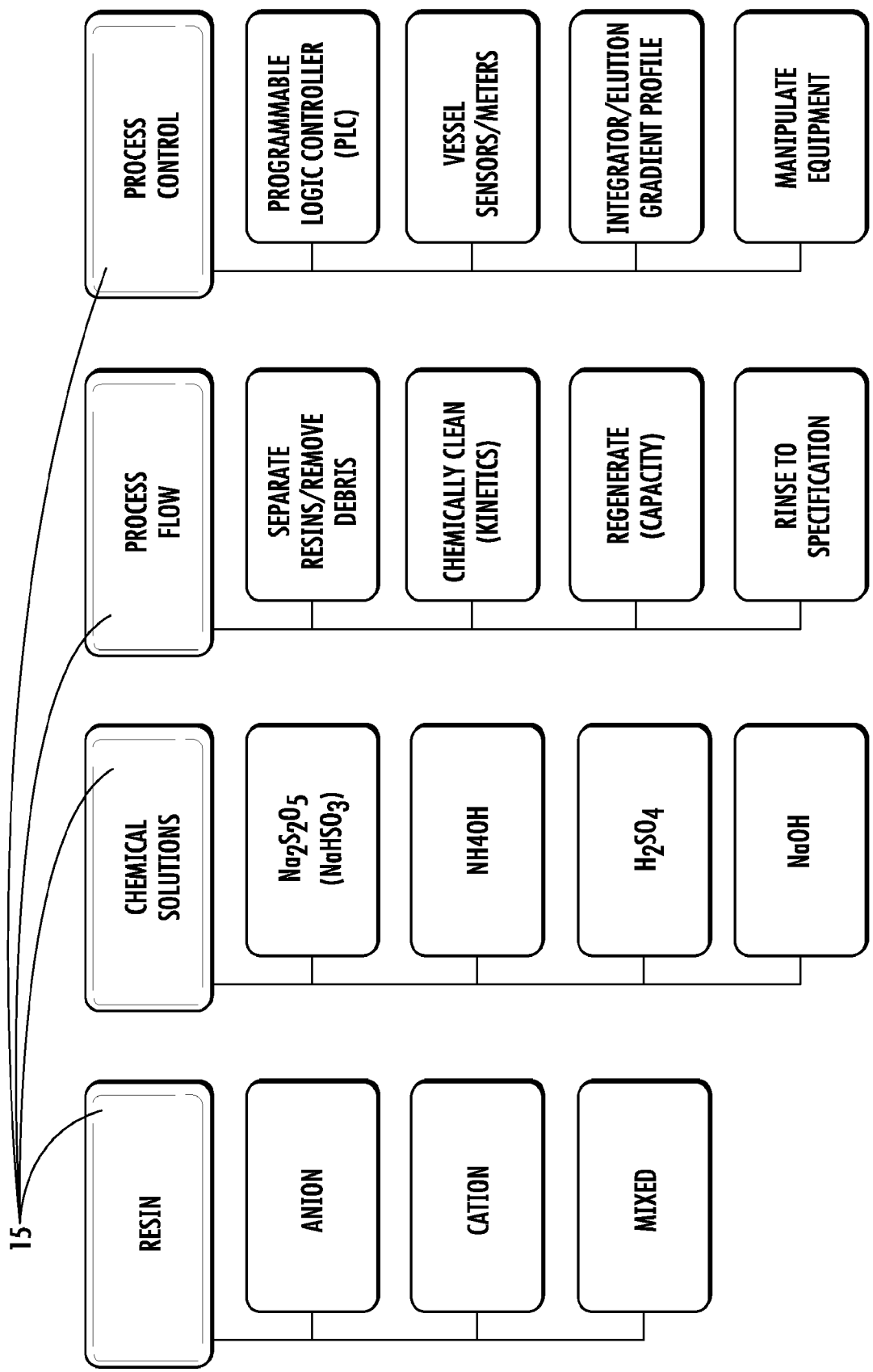
FIG. 2 depicts a flow chart of major components of the cleaning process, Resin, Chemical Solutions, Process Flow, and Process Control of use of the method of the present invention for restoring resin kinetics.
Figure 3:
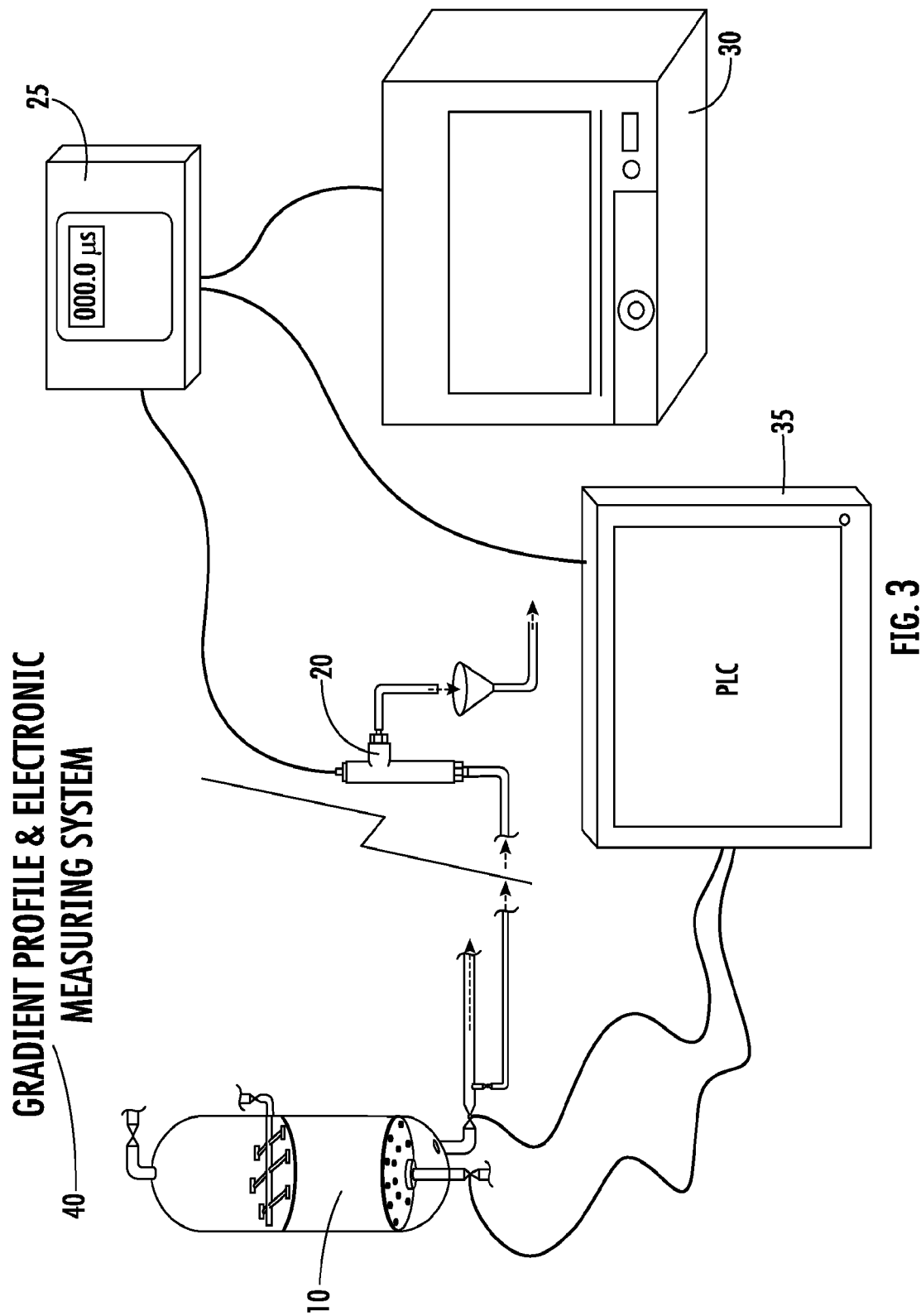
FIG. 3 exhibits a view of Electronic Monitoring System (40) associated with the method and system of the present invention, depicted in use of Resin Elution Gradient (40) Profiles.
Figure 4:
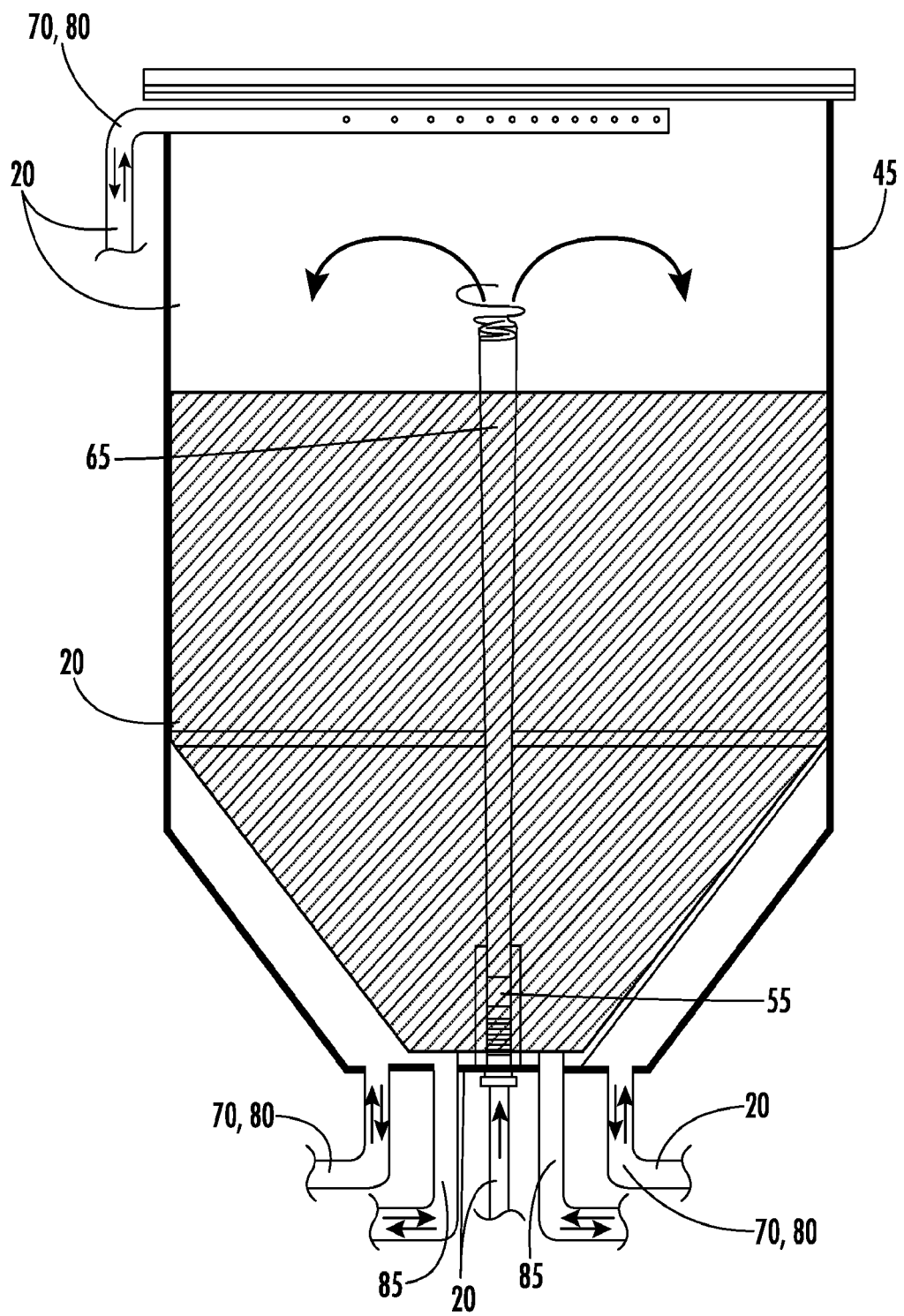
FIG. 4 shows a cross-sectional view of the Vertical Cleaning Vessel Layout (45) employed in the method and system of the present invention.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a system and method for the purification and cleansing of resins and resin surfaces in order to restore resin kinetics (mass transfer coefficient—MTC) and ion exchange functionality. When a bisulfite solution is buffered with an acid solution to the pH range of 3.0-5.0, anionic organic and protonated organometallic complexes efficaciously detach from anion resin surfaces. For the purposes of this application, this combined solution is referred to as the cleaning solution (15). When organic materials are removed from resin surfaces, ion exchange functionality (kinetics) is restored, allowing resin to perform as designed. Following exposure to the cleaning solution (15), ion exchange sites are fully exhausted and require multiple regenerations with concentrated acid or caustic solutions to fully restore ion exchange capacities. Periodic sulfite cleanings bolster resin health initiatives and maintenance programs by eliminating cumulative negative effects of organic impairment on resins.

The method of the present invention employs at least one vessel (10)(45)(50) as disclosed in FIGS. 1-6, to facilitate the restoration of the kinetic properties of the resin. A primary benefit of the system and method of the present invention is that multiple chemical processes typically requiring use of three or more separate vessels, have been combined into a single multi-use vessel (45)(50). This newly designed vessel (45)(50), when combined with sulfite reducing chemical, removes resin fines, suspended iron and debris, restores kinetics, regenerates, and rinses resin to specifications rarely achievable with currently regeneration processes. As such, the method of the present invention is accomplished via use of a multi-use cleaning vessel (45) (50), containing a central eductor/plenum (60, 65), wedge-wire screen draw-chamber (55), sulfite/catalyst reducing solution (15), an electronic monitoring and control system (40), and a diffusion-shifted displacement (90) final rinse process.

Benefits and strengths of the present invention may include, but are not limited to:
1. Noncombustible and nonflammable sulfite/catalyst reducing chemical.
2. Maintains chemical compatibility with rubber linings and stainless-steel alloys.
3. Cation complimentary as a cation bisulfite, ammonium bisulfite.
4. Chemical reactions are monitored real-time during the cleaning, regeneration, and rinsing process (elution gradient (40) profiling).
5. Diffusion-shifted displacement (90) rinse techniques drive lowered final rinse end-points.
6. Central eductor/plenum (60, 65) drawing of resin from off the bottom of cleaning vessel (45)(50), depositing on top of the resin charge, when in contact with cleaning and regenerant chemicals.
7. Continuous resin and chemical recirculation.
8. Requires less than 10% of current processes regeneration chemicals.
9. Generates less than 10% of regeneration wastes of current processes.

The eductor/plenum (60, 65) of the present invention is preferably an off-the-shelf item which can therefore be sized and purchased specifically for vessel (45, 50) size. Eductor (60) sizing for total resin volume transport capability is determined by vessel (45)(50) size, system pressures, gpm of eductor (60) motive solution, and desired total cubic feet of resin to be drawn per unit of time. Per convention, the eductor (60) of the present invention is used to facilitate mixing and contact time of chemical with resin and provides motive solution for direct transfer of resin from vessel bottom to vessel top. The eductor/plenum (60, 65) of the present invention is equipped with potentially a variable-flare extension extending to above the upper level of resin. The flared extension plenum (65) of the eductor (60) is configured to provide a direct transfer path for depositing resin on the top of the resin charge, from the bottom of the vessel draw chamber (55). Flow paths of the present invention includes resin drawn from off the floor of the vessel draw chamber (55), transporting the resin & solution (15) upward through the plenum (65) to exit the plenum (65) and settle as the top layer of resin. The main function of the eductor/plenum (60, 65) is to draw resin & solution (15) from the vessel bottom, and to provide a direct pathway to the top of the resin charge. During the transfer process, the upper layer of resin is drawn downward through the vessel and into the wedge-wire draw chamber (55) until it reaches the bottom of the draw chamber. Once there, the eductor (60) draws it from the floor bottom to push it upwards through the plenum (65). Inside the eductor (60), the resin and cleaning/regeneration solutions (15) are mixed via vortex flow motion, travelling up the plenum (65) and exiting onto the top of the resin charge. This flow path is performed continuously until the resin is clean or requires regeneration. Regeneration and rinse flows are identical to the path of the cleaning chemical.

This resin transfer and circulation process within the vessel (45)(50) of the present invention is in contrast to conventional resin cleaning/regeneration vessels in which cleaning and regeneration chemicals are forced through compacted resins. Conventional regeneration methods move chemical through a motionless resin bed. In such cleaning/regeneration vessels, frequent issues associated with high/low flow regions within the cleaning vessel, and flow anomalies that are a result of various pendant transport headers designed into the vessel, require skilled troubleshooting and constant attention to the process. The use of an eductor (60) utilizing an extended discharge plenum (65) in the system of the present invention resolves issues associated with conventional regeneration vessels, such as low-flow regions, header induced flow anomalies, and regions of residual chemical hide-out.

A critical attribute relating to the efficacy of the system and method of the present invention is the ability to monitor and control chemicals and reactions on resins during all phases of the cleaning, regeneration, and rinse processes. Use of an electronic monitoring and control system (40), precisely configured within the vessel (45)(50), monitors resin and chemical reactions throughout the cleaning, regeneration, and final rinse processes of the system.

Chemical monitoring is achieved via the use of strategically positioned conductivity/toroidal sensors (20), pH sensors, temperature sensors, sodium instrumentation and other electronic means (40), of securing process information. Data received from electronic sensors (20) is collected by a data logger/integrator (30), used to develop elution gradient (40) profiles during each step of the cleaning, regeneration, and rinse process. The data set, when displayed graphically, produces unique elution gradient (40) profiles representing conductivity, pH, concentrations, and various other chemistry constituents, per unit time. The elution Gradient (40) profile of the electronic monitoring system (40) provides graphic representation of process data for conducting forensic analysis, and is extremely valuable when attempting to interpret process anomalies.

Intended use of the electronic monitoring (40) data of the present invention is to provide insights for revising process parameters, step times, chemical concentrations, process termination, etc. Gradient profiles act as baselines for comparing performance shifts, trending and predictive analyses. Recommended strategic placement of these elements of the electronic monitoring and control system (40) of the present invention can be seen in FIG. 1.

Baseline curves of the results provided by the electronic monitoring and control system (40) are initially derived by processing each newly purchased resin charge prior to being placed into service. Cleaning and regeneration data of newly purchased resin charges provides insight to baseline data of virgin resin prior to contamination, and can be used for predictive trending of resin degradation over time. As such, subsequent cleaning and regeneration activities performed by the system of the present invention on aging resins relies on baseline data (curves) and end-points as a model for anticipating and achieving completion of each step of the cleaning and regenerating process. Data loggers (30) gather real-time data during each separate phase, permitting real-time and forensic evaluation of the data upon completion of the cleaning and regeneration process. This becomes very useful in the event that programmed steps for cleaning times, flow rates, or chemical concentrations fail to clean, recover, regenerate, or rinse resins to acceptable quality as expected.

Benefits of performing an initial regeneration elution gradient (40) profile on newly purchased resins with this system and method of the present invention are twofold; firstly, it removes residual organic sulfonates that remain on new cation resins due to the manufacturing process, which is known to severely degrade anion resins; secondly, it establishes baseline information of a newly purchased resin charge, which is used to compare future cleaning and regeneration data against as the resin degrades with time and use. Baseline data allows qualitative and quantitative adjustments to the cleaning and regeneration processes to account for degrading trends. Comparing future regeneration data to the original baseline data permits the user to develop requisite cleaning and regeneration strategies to address minor shifts in performance, before degradation is irreparable, resulting in uninhibited impurity throw. Electronic monitoring of the system (40) and method of the present invention arms the user with evidence of deficient parameters, such as inconsistent chemical concentrations, inadequate injection times, or grossly extended rinse times. Modifications to the process can be made to make minor adjustments for maintaining a high-quality effluent. The ability to observe and trend minor shifts in physical and/or chemical attrition during performance of cleaning or regenerating resins, is currently unavailable.

Output from electronic monitoring instrumentation chemistry meters (25), employed in the electronic monitoring and control system (40) of the present invention is configured to interface with a Programmable Logic Controller (PLC) (35) per convention, to provide controller feedback from which the PLC (35) can respond to process parameters. The PLC (35) can adjust system pumps, valves, repeat sequences, alter step times and concentrations, etc. during process execution. The system is preferably configured to automatically make adjustments to certain predefined parameters as required, based on feedback received from the electronic monitoring system (40).

For example: if pH of the cleaning solution trends downward in one section of the vessel (45)(50) from an adjacent section (as indicated by a corresponding drop in pH readouts) the system responds by adjusting feed valves slightly more open to allow additional cleaning chemical/acid solution (15) until pH has recovered and is being maintained in the desired range. The PLC (35) receives output signals from Toroidal (conductivity), pH, flow, Temperature, and sodium instrumentation (20). As the PLC (35) receives process data, it will generate appropriate control signals to system parameters. Built-in step timers control times and sequences to process resins with the correct chemical concentrations to recover kinetics and ion exchange capacities. Data loggers & integrators (30) record output data (temp, conductivity, pH, dates/times, flow rates, chemical concentrations, etc.) for real-time and forensic evaluation of the process.

The electronic monitoring and control system (40) of the present invention acts as a go/no-go tool during regeneration. If 16% regenerant is being injected onto resin during a regeneration, eventually the waste stream will also reach 16% concentration as the resin becomes fully regenerated, and chemical demand has ceased. The operator can terminate the injection step, even though additional time has been allocated and programmed for this step. Continuing the injection of caustic in those conditions results in wasted chemical, and creates unnecessary waste volumes to neutralize and disposition. Likewise, if the waste stream is measuring only 10% concentration when the step time has expired, and 16% is being injected, the user would certainly extend the injection step until the resin's chemical demand has been satisfied, as indicated by 16% concentration of caustic in the waste stream. If resin chemical demand is not satisfied during the regeneration process, short run times and potential ionic leakage can occur. Real-time data arms the user with previously unavailable insights that quantifiably justify operator intervention when needed. As the data logger (30) collects and processes data for graphic display, the PLC (35) responds to automatic feedback of system parameters to actuate valves and pumps. Touch screen displays which are part of the PLC (35), provide operators with a human-machine-interface (HMI) for over-ride control when required.

Experimental Results:

Ammonium sulfite monohydrate can be dissolved in water or metabisulfite can be purchased in liquid form at desired concentrations below 70% to prepare the cleaning solution (15). Impure liquid bisulfite solutions containing stabilizers such as potassium hydroxide, sodium carbonate, or other commercial preservatives, exhibited impaired cleaning capabilities during testing. Concentrated bisulfite solutions in the liquid form must be free from all manufacturing stabilizers to perform effective organic and iron removal.

The cleaning process effectively cleans resin in any state of exhaustion. Cleaning cation and anion resins in the mixed state seemed to have no adverse impacts, although anion and cation resins must be separated prior to post-cleaning regeneration.

For efficient resin cleaning, specific gravity/density and pH of the cleaning solution (15) must be maintained. Specific gravities of ~1.40 were required to allow exhausted cation resins to settle, and specific gravities of ~1.10 were required to float exhausted anion resin, although different levels of organic or iron fouling contributed to additional density of used resins. When resins became super-saturated with ammonia and sulfate, resin densities increased, requiring adjustments to strengthen chemical concentrations. When anion resin became super saturated with sulfate that was converted from sulfite during the cleaning process, it was noted that the resin required several cycles of cleaning and regenerations to fully remove iron compounds that had been complexed with hydroxide during prior regenerations. If resin was severely fouled with surface iron, several cleaning/regeneration cycles were required to remove the surface iron. Significant kinetic restoration was consistently found to occur after only a single cleaning cycle followed by dual regenerations, which is positive news if ion exchange kinetics are the focus of resin cleaning. If 100% iron removal is the goal, several cleaning and regeneration cycles via use of the system and method of the present invention are needed.

If resin is cleaned as a mixed bed, they must eventually be separated to enable individual cation and anion regenerations. Chemical byproducts that are produced by the cleaning process include a small amount of sulfur dioxide fumes, water, and ammonium sulfate waste. As the sulfite/catalyst solution (15) protonates iron oxides, the sulfite is converted to sulfate, altering pH, conductivity, and density of the cleaning solution (15). Close scrutiny of system parameters is vital for maintaining proper cleaning solution (15) concentrations during the cleaning process to ensure efficiencies are maintained and organic and iron foulants are deconstructed.

Extreme care should be taken to minimize contact of ambient or other sources of free oxygen with the sulfite cleaning solution (15), as available oxygen will be immediately consumed by the cleaning solution (15), converting available ammonium sulfite to ammonium sulfate, and decreasing iron reducing properties of the cleaning solution (15).

Anion resins having significant kinetic impairment due to iron, required additional contact time (cleaning & regeneration cycles) with sulfite/catalyst cleaning solution (15) to remove the majority of iron.

Laboratory experiments showed that consistent ion exchange kinetic recoveries were achieved with concentrations ranging from ~2.0%-40.0% ammonium bisulfite solutions (15), catalyzed with ~0.5%-2.0% sulfuric acid concentrations.

Restoration of resin ion exchange capacity is required after fully exhausting during cleaning, and requires a minimum of two regenerations at manufacturer recommended regenerant dosages. Prior to post/cleaning regenerations, all residual cleaning solution must be thoroughly rinsed from the exhausted anion resins to avoid thermal damage of resin surfaces that can result due to exothermic reactions of the low pH cleaning solution (15) and caustic regenerant.

During the testing process, a 2N sodium hydroxide regenerant solution was used to regenerate anion resin to full ion exchange capacity, increasing anion resin kinetics from $1.4$-$1.6 \times 10E$-$4$ m/s, to greater than $2.0 \times 10E$-$4$ m/s (MTC). No adverse effects have been noted on resins resulting from the present invention. Regeneration of newly purchased resin is highly recommended prior to first use.

Referring to FIGS. 1-6, use of the process, method and system of the present invention is preferably as follows:
  A. Chemical—the Cleaning Solution (15)
    1. Sulfite (SO3) reducer (ammonium bisulfite or similar)
    2. Acid (H2SO4) catalyst (sulfuric acid or similar)
  B. Recirculation Eductor/Plenum: (60, 65)
    1. Off-the-shelf eductor (60) purchased)
    2. Extended plenum (65) (purchased/fabricated)
    3. Increased contact time (resin & chemical)
    4. Recirculation method (resin drawn from bottom & deposited on top)
    5. Complete resin ion exchange kinetics recovery (as-new condition)
    6. High quality resin regeneration (100%)
    7. Extremely high quality rinse end-point (<1.0 µS)
    8. Less than 10% of normal chemical usage (~7%)
    9. Less than 10% of normal time to regenerate
    10. Less than 10% of normal waste stream volumes generated
  C. Wedge-Wire Draw-Chamber: (55)
    1. Off-the-shelf, order to build, resin screen (purchased) (55)
    2. Forced resin, eductor (60) draw
  D. Automated Elution Gradient Profile: (40)
    1. Electronic chemical process measurement during each phase
    2. Go/no-go tool for process termination/extension
    3. Forensic evaluation of cleaning, regeneration & rinse processes
  E. Diffusion-Shifted Displacement Rinse End-Points: (90)
    1. Significant rinse water & waste volume reductions 2. Significant time reduction F. Device Identification Reference Numbers:

10 Conventional cleaning vessel

15 Cleaning Process, including resin types, chemicals used, four cleaning phases, electronic monitoring control system 20 Electronic measurement probes of various nature, including pH, conductivity/toroidal, temperature, concentration, flow rate (gpm), etc.

25 Chemistry meters

30 Digital Integrator/Data Logger

35 Programmable Logic Controller (PLC)

40 Electronic Monitoring System—Elution Gradient Profiling (data graphing)

45 Vertical Cleaning Vessel

50 Horizontal Cleaning Vessel

55 Wedge-wire Screens Draw Chamber

60 Eductor

65 Plenum

70 Chemical & Water inlet

75 Eductor Motive Feed, Chemical/Water

80 Waste Outlet

85 Resin Inlet/Outlet

90 Diffusion-Shifted Displacement

It should be understood that the singular vessel (45)(50) of the present invention containing, eductor(s) (60), plenum (65), wedge-wire screens (55), and electronic monitoring system (40), are to be utilized during fines removal, entrained iron removal, kinetics recovery, and resin regeneration/rinse processes. Similarly, it should be noted that the vessel (45)(50) of the present invention, is sealed or pressurized with water and/or cleaning solution (15) when performing ion exchange kinetics recovery steps utilizing cleaning/reducing agents composed in part of sulfite. On contact with available free oxygen, cleaning/reducing solutions convert from sulfite to sulfate, reducing its efficacy to deconstruct long-chain organic material or iron oxides.

Post cleaning regenerations are required to reactivate ion exchange sites on resin surfaces. Final rinses can tally many thousands of gallons and hours of rinsing to achieve rinse end-point goals, usually in the range of <0.080 µS, which is very close to pure water (0.055 µS). Many times, resins exhibiting fouling or impaired kinetics will never reach desired rinse end-points or flow anomalies will exist within the resin vessel (45)(50) that inhibit effective hydraulic conditions for reaching high quality rinse end-points. Rinse conductivities will often rinse down to approximately 10-15 µS and then level off and refuse to rinse down any further.

A method for achieving extremely low final rinse end-points has been developed as part of the system and method of the present invention, that exploits mass transfer properties of physics to achieve excellent rinse end-point conductivities. Residual regenerant chemicals captured inside surface crevices of resins during regenerations, will experience difficulty "rinsing" out of resin surface micro-crevices due to hydraulic pressures on resin surfaces associated with high-rate flows during fast rinses. To effectively remove these crevice contaminants, flow should be terminated. For example, short soak periods of five minutes or so, allows concentrated impurities held inside crevices to naturally diffuse out of the crevice and into interstitial waters surrounding the resin.

Natural diffusion always flows from high concentration to low concentration. Equilibria is reached relatively quickly as interstitial waters become saturated to that of the surfaces inside crevices, essentially stopping the diffusion process. When contaminant concentrations become equal between crevice surfaces, and the surrounding interstitial waters, displace (to waste) one bed volume of de-ionized (DI) water from the resin charge. As fresh DI water replaces the contaminated water for another soak, the diffusion process begins again, moving from crevices to surrounding waters until contaminant levels inside crevices are low enough to produce the desired final rinse end-points.

A series of soaks followed by single-bed-volume displacements have been shown to save substantial amounts of DI water, eliminating unnecessary hours spent rinsing. Depending on relative conductivity starting points of the diffusion-shifted displacements (90), each displacement may yield up to 50% reduced contaminant levels as rinse conductivities decrease.

Soak times can be altered. After several soak steps have been performed, and crevice contamination levels have decreased, longer soak times may yield greater impurity removal, due to weakened diffusion driving force due to lowered concentrations of impurities remaining inside crevices. Highly concentrated crevices quickly saturate surrounding waters, halting the diffusion process until it is replaced with fresh DI water. Typically, shorter soak times are required initially, with longer soak times needed towards final displacement end-point conductivities are achieved.

In short, it should be noted that the process of the present invention using the vessel of the present invention is preferably as follows: first, obtain spent resin. Then, the spent resin is introduced to the vessel (45, 50), the vessel contains a sulfite reducing chemical cleaning solution (15), as well as a sulfuric acid for the regeneration of cation resins, and sodium hydroxide for the regeneration of anion resins. The cleaning solutions (15), including the regenerants as well as flush waters are preferably configured to flow bi-directionally thorough at least one wedge-wire screen to facilitate cleaning and regeneration of the resins. Further, the resins are contained and channeled within a wedge-wire screen draw chamber (55) as the resin is pulled towards the bottom of the vessel (45, 50) via an eductor. The wedge-wire screen draw chamber (55) removes waste from the resin when the resin reaches the bottom of the vessel (45, 50). The vessel outputs the waste removed from the resin via a waste outlet (80), a wedge-wire waste outlet, or both. The eductor (60) is equipped with a plenum (65) which redirects the resin to the top of the vessel (45, 50) where it may be recirculated back down towards and through the wedge-wire screen draw chamber. The electronic monitoring and control system of the present invention employs electronic sensors which monitor and respond to the current state of the chemical(s) (cleaning solution (15)) and resin as it circulates within the vessel. After cleaning, the resin is regenerated, and then rinsed using a diffusion-shifted displacement (90) final rinse process to achieve a specific predetermined state.

Because resin charges are an excellent filter media for capturing unwanted suspended solids, metal oxides (e.g., rust, etc.) and other debris hereinafter referred to as crud, are seized and detained within resin charges during service runs. Physical cleaning is required to remove this unwanted material, prior to chemical regeneration of the resin.

Conventional methods of removing suspended metal oxides, organics, and debris adhered to resin surfaces rely on aggressive physical agitation utilizing high-velocity compressed air, referred to as "air scrubbing". High-rate volumes of air are introduced into a water/resin mixture to create stirring actions that are meant to dislodge and remove the unwanted crud. Although this type of resin cleaning has been performed for many decades, it has significant downsides. For example, it allows unacceptable levels of crud to remain suspended within resin charges, it promotes pronounced damage to resin surfaces, and ultimately produces marginally cleaned resin charges in preparation for resin regeneration.

Due to the inherent inefficiencies of the traditional air scrub process, a certain amount of foreign material will often remain entrained within the resin charge, even after air-scrub cleaning steps have been completed. As this unwanted and variable quantity of crud accumulates over time, it is gradually ground into extremely fine particles by these abrasive cleaning activities. Air scrubbing resin in the presence of this extremely small particulate crud embeds tiny amounts of it into micro-crevices on resin bead surfaces. Metal oxides and residual regeneration chemicals that become lodged within these crevices require chemical removal. If not removed, effective chemical regenerations of the resin ion exchange sites are impossible, leading to prolonged final-rinses that are unable to achieve desired rinse end-points and ultimately resulting in premature resin replacement.

Additionally, resin and water mixtures having excessive water voids (i.e., more water, less resin), mean that beads are travelling greater distances and colliding with greater forces, allowing up to 180° of potential head-on collisions between resin beads at high velocity. In conventional air scrub processes, velocities and force vectors of colliding beads during the scrubbing process are controlled by reducing suspension water volumes, to avoid unnecessary bead fractures and associated resin fines. Traditional air-scrub cleaning techniques create inordinately high levels of resin damage and resin fines.

Contemplated herein is a scrubber module which effectively cleans suspended resins through physical and chemical means while minimizing the damage done to the resins. According to various embodiments, an eductor 60 provides the necessary means to propel the suspended resins through moderately tortuous cleaning circuits within the scrubber module that utilize the effects of cyclonic and centrifugal forces. As opposed to traditional cleaning practices of flooding stationary resins beds with chemicals, the contemplated scrubber module intimately moves resins and chemicals throughout the cleaning circuit while fully immersed in the cleaning and regeneration chemicals. Cleaning, regeneration, and rinse processes are significantly shortened, and waste streams are significantly reduced when performed using the scrubber module contemplated herein.

According to various embodiments, the scrubber module reduces the damage to the resins by pushing the resin beads through one or more helical pathways, such that the resin beads are not able to collide with large angles of impact while also maintaining continuous contact with the solution. This avoids impact collisions while also ensuring a scrubbing action on bead surfaces.

The use of a scrubber module results in a reduction in total time needed to deconstruct metal oxides and organic materials on the resin beads, while also minimizing the fines production and physical attrition of resin beads inherent to conventional methods. The low impact/high contact surface scrubbing on resins provided by the systems contemplated herein avoid the hydraulic anomalies associated with stagnant (i.e., non-moving) resin beds.

The contemplated systems and methods use cyclonic and centrifugal forces to thrust resins against interior conduit surfaces while spinning through the scrubber module. Large changes in angular flows that result in high resin surface impact forces are minimized by these rotational flow properties. The present invention relies on maintaining continuous resin-resin, and resin-conduit communication to constantly expose new foulant material as the erosion process is completed during the chemical deconstruction process. Low turbulence resin handling of the scrubber module minimizes broken beads and resin fines, and also reduces bead crevice compaction and loading. In some embodiments, the scrubbing action may be further improved by modifying the velocity that the suspended resins and cleansing fluid move along the helical pathways.

Figure 7A:
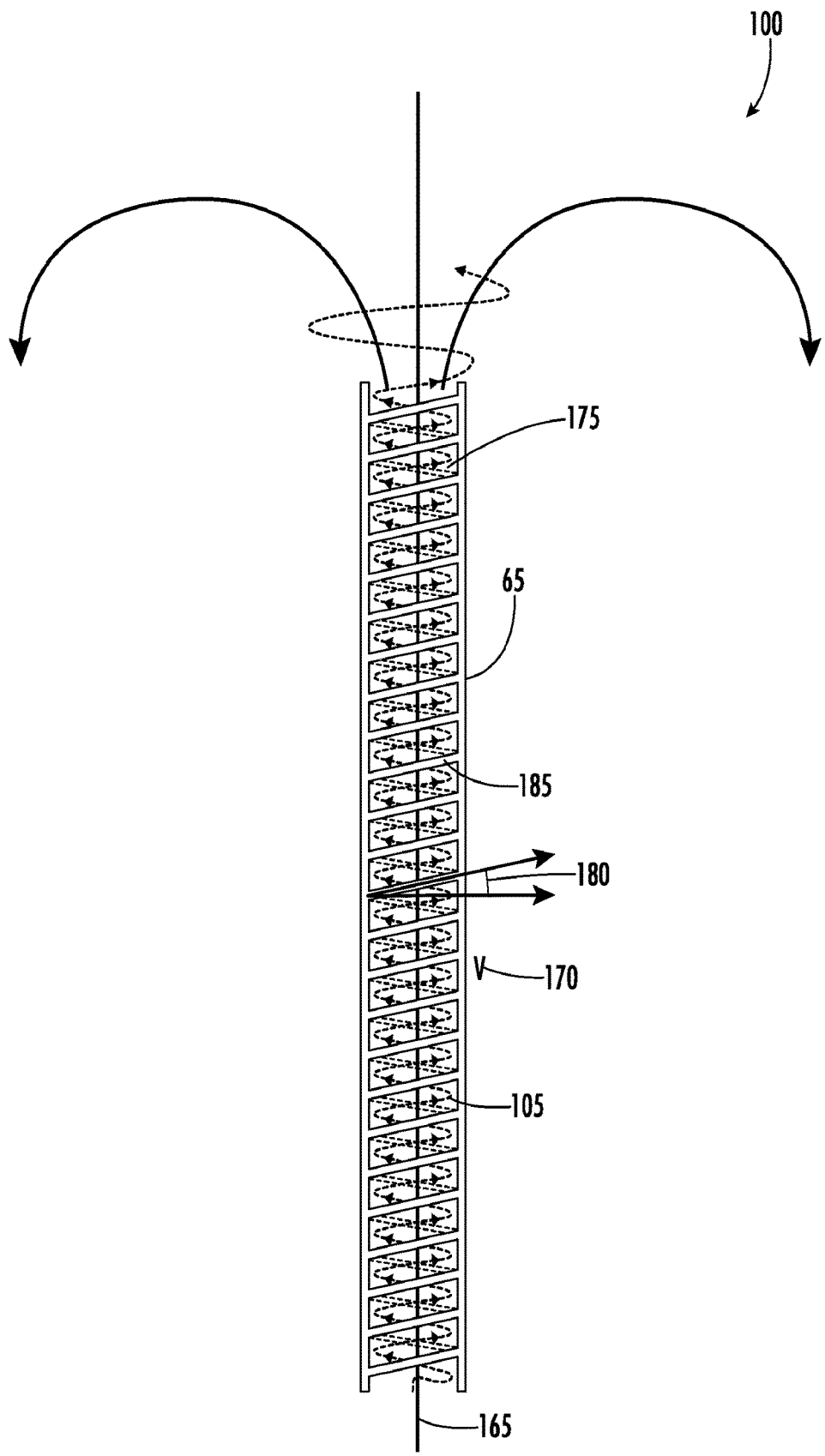
FIGS. 7A and 7B is a cross-sectional view of a scrubber module (100) employed in the method and system of the present invention.
Figure 7B:
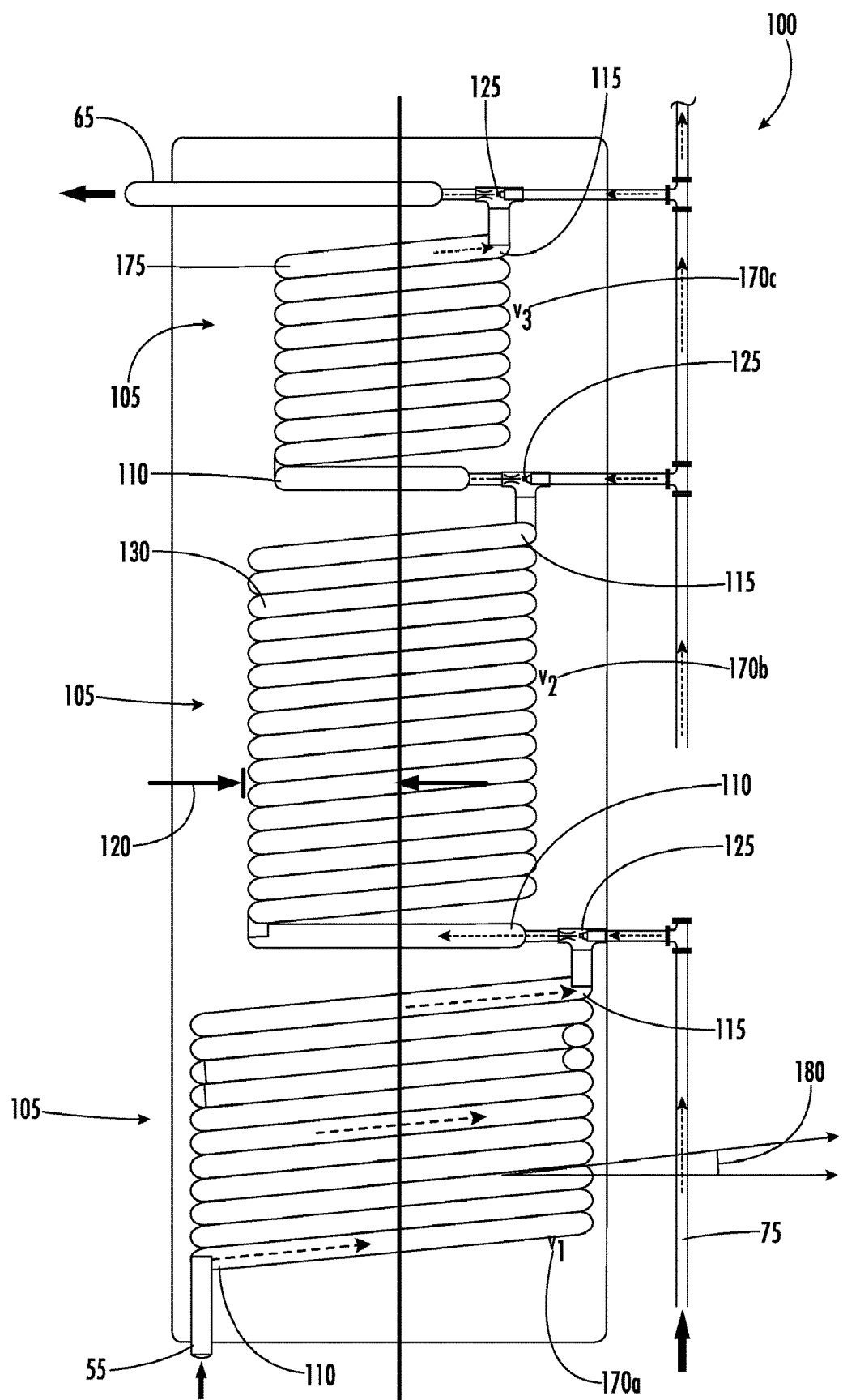

FIGS. 7A and 7B are cross-sectional views of non-limiting examples of a scrubber module 100. As shown, the scrubber module 100 comprises at least one helical pathway 105, which comprises a pathway inlet 110 and a pathway outlet 115. In some embodiments, each helical pathway 105 further comprises a booster eductor 125 to help propel suspended resin beads and the cleaning solution through the scrubber module 100, from the bottom of the vessel 45, 50, to the top of the vessel 45, 50 where the resin is deposited, as discussed above.

In the context of the present description and the claims that follow, a helical pathway 105 is a conduit 175 rotating about and propagating along an axis 165. It should be noted that while the non-limiting examples of helical pathways 105 shown in FIGS. 7A and 7B rotate about and propagate along axes 165 that are linear, in other embodiments a helical pathway 105 may rotate about and follow a non-linear path. This coil or spiral shape is advantageous, as it results in a conduit 175 that enhances the cyclonic and centrifugal forces on the resins without permitting high resin surface impact forces associated with conventional systems where the resin is able to gain momentum sufficient to damage the resin and produce fines. It should be noted that while the non-limiting examples shown in FIGS. 7-9 rotate about the axes 165 with symmetric, uniform circular rotations having a fixed pitch 180, in other embodiments the helical shape may have less symmetry (e.g., a pathway radius 120 and/or pitch 180 that varies in magnitude as the pathway propagates, etc.).

Each helical pathway 105 is made up of a conduit 175, which is any channel able to convey the resins and the cleansing fluid in which they are suspended along the helical pathway 105. In some embodiments, such as the non-limiting example shown in FIG. 7B, the conduit 175 may be a length of coiled pipe 130. As shown, the pathway 105 may be described as having a pathway radius 120, as measured from the axis 165. In some embodiments, the pathway radius 120 may be minimized, such that the conduit 175 is bound, in part, by the axis itself. See, for example, the helical pathway 105 shown in the non-limiting example of FIG. 7A, which is the tight spiral formed by the coupling of a spiral flighting 185 within the plenum 65. Unlike the coiled pipe 130 shown in FIG. 7B, the conduit 175 of FIG. 7A has overlapping portions that share a common wall (e.g., the spiral flighting 185). Still other embodiments may employ other helical shapes.

In the non-limiting example shown in FIG. 7B, the scrubber module 100 comprises three helical pathways 105. In some embodiments, the scrubber module 100 may comprise a single helical pathway 105, meaning the bottom of the vessel 45, 50 is in fluid communication with the top of the vessel 45, 50 through a single length of conduit 175. In other embodiments, the scrubber module 100 may comprise two, three, or more helical pathways 105. See, for example, the three coiled pipes 130 of FIG. 7B.

In embodiments comprising more than one helical pathway 105, the helical pathways 105 are joined to form a single conduit path, with the pathway outlet 115 of one helical pathway 105 coupled to the pathway inlet 110 of the next helical pathway 105. As will be discussed further, below, in some embodiments the segments may be joined through a booster eductor 125, to assist the propulsion of the suspended resin and cleaning solution through the scrubber module 100.

The non-limiting examples shown in FIGS. 7B and 8 comprise coiled pipes 130 having a circular cross-section, and which are coiled in a circular spiral. It should be noted that while these non-limiting examples show pipes 130 having a circular cross-section, other embodiments may employ pipe having a different shape, such as an ellipse or other shape that is able to provide a path that prevents the resin beads from the high velocity collisions common to conventional air scrubbing methods. Those skilled in the art will recognize that a variety of conduit cross-sections and/or helix types/shapes may be employed to have low turbulence while taking advantage of cyclonic and centrifugal forces.

In some embodiments, the conduit 175 of each helical pathway 105 of a scrubber module 100 may have the same cross-sectional area/shape. In other embodiments, the conduit 175 within a scrubber module 100 may have different sizes and shapes. In still other embodiments, the conduit 175 may change size and/or shape within the same helical pathway 105. Such modifications may be utilized to manipulate the flow resistance of the suspended resin, and thus eductor efficacy, to further optimize the cleansing process.

As shown, each helical pathway 105 has a pathway radius 120. According to various embodiments, a pathway radius 120 is the radius of the helix or spiral. While the meaning of a pathway radius 120 is clear in the case of a helix having a uniform, circular spiral, this may not always be the case. As discussed above, in some embodiments the conduit 175 (e.g., coiled pipe 130, etc.) of a helical pathway 105 may have a variety of shapes. For example, in some embodiments, the helical pathway 105 may tighten or loosen as it propagates from inlet 110 to outlet 115, growing smaller or larger. In other embodiments, the spiral may have a non-circular shape. In the context of the present description and the claims that follow, a pathway radius 120 refers to the radius of a helical pathway 105 that defines the coil geometry. In cases where the radius of the spiral varies within a helical pathway 105, the pathway radius 120 may be defined as the average radius of the spiral over the length of the helical pathway 105. The same treatment may be applied in embodiments where the helical pathway 105 has a spiral geometry that deviates from circular.

Some embodiments of the scrubber module 100 comprise booster eductors 125. According to various embodiments, each helical pathway 105 may have a booster eductor 125 coupled to either the inlet 110 or the outlet 115, resulting in all of the pathways 105 being connected through booster eductors 125. In some embodiments, the booster eductors 125 may be further coupled to the eductor motive feed 75, using the cleaning solution to move the resin alone its path.

For example, boosters located at the outlet ends of the pathways 105 draw the resin mixture out of the exited helical pathway, reducing frictional losses associated with a coiled conduit. The booster eductor 125 injects motive liquid energy to help push resin mixtures through the next helical pathway 105 of the scrubber module 100. These eductors serve to reduce head and friction losses and increase motive forces that return the resin to the top of the cleaning vessel.

According to various embodiments, the helical pathway 105 is configured (e.g., sized, shaped, etc.) such that the resin and the cleansing fluid in which it is suspended moves through the pathway 105 at a velocity 170 that results in the resin surfaces being buffed clean by their journey through the scrubber 100. In some embodiments comprising multiple helical pathways 105, the pathway radius 120 of the different helical pathways 105 that make up the scrubber module 100 may be varied to manipulate the velocity 170. As a specific example, in the non-limiting example shown in FIG. 7B, the scrubber module 100 has three helical pathways 105, each having a different pathway radius 120. Specifically, the first has a large diameter, the second has a medium diameter, with the third and final coil has the smallest overall pathway radius 120. This particular embodiment also employs multiple booster eductors 125.

Continuing with the specific, non-limiting example shown in FIG. 7B, the resin mixture discharge of the large coil uses a booster eductor 125 that will draw from the outlet of the large pathway and discharges into the inlet of the medium sized pathway. The medium sized pathway has a booster eductor 125 that draws from the outlet of the medium pathway and discharges into the inlet of the small pathway. The small pathway has a booster eductor 125 drawing from the outlet of the small coil, discharging back onto the top of the resin cleaning vessel via resin return piping.

As shown, the consequence of the progressive tightening of the helical pathways 105 in FIG. 7B is that the velocity 170 gradually increases, from a first velocity 170a, to a faster second velocity 170b, and then to an even faster third velocity 170c. The lower velocities would have a minimal scrubbing effect, with the higher velocities having a greater scrubbing effect (both wanted and unwanted). In some embodiments, the velocities may be varied, increasing from slow to fast. In other embodiments, the velocities may start fast and gradually decrease. In still other embodiments, the velocity magnitudes may both increase and decrease throughout the scrubber module 100.

Other embodiments may make similar modifications to the velocity 170 within a helical pathway 105 using methods other than modifying the pathway radius 120. These methods may include, but are not limited to, modification of conduit 175 size and/or shape, and modification of the shape or nature of the helix shape of the pathway 105 itself (e.g., growing more oblong, changing pitch 180, etc.).

Figure 9:
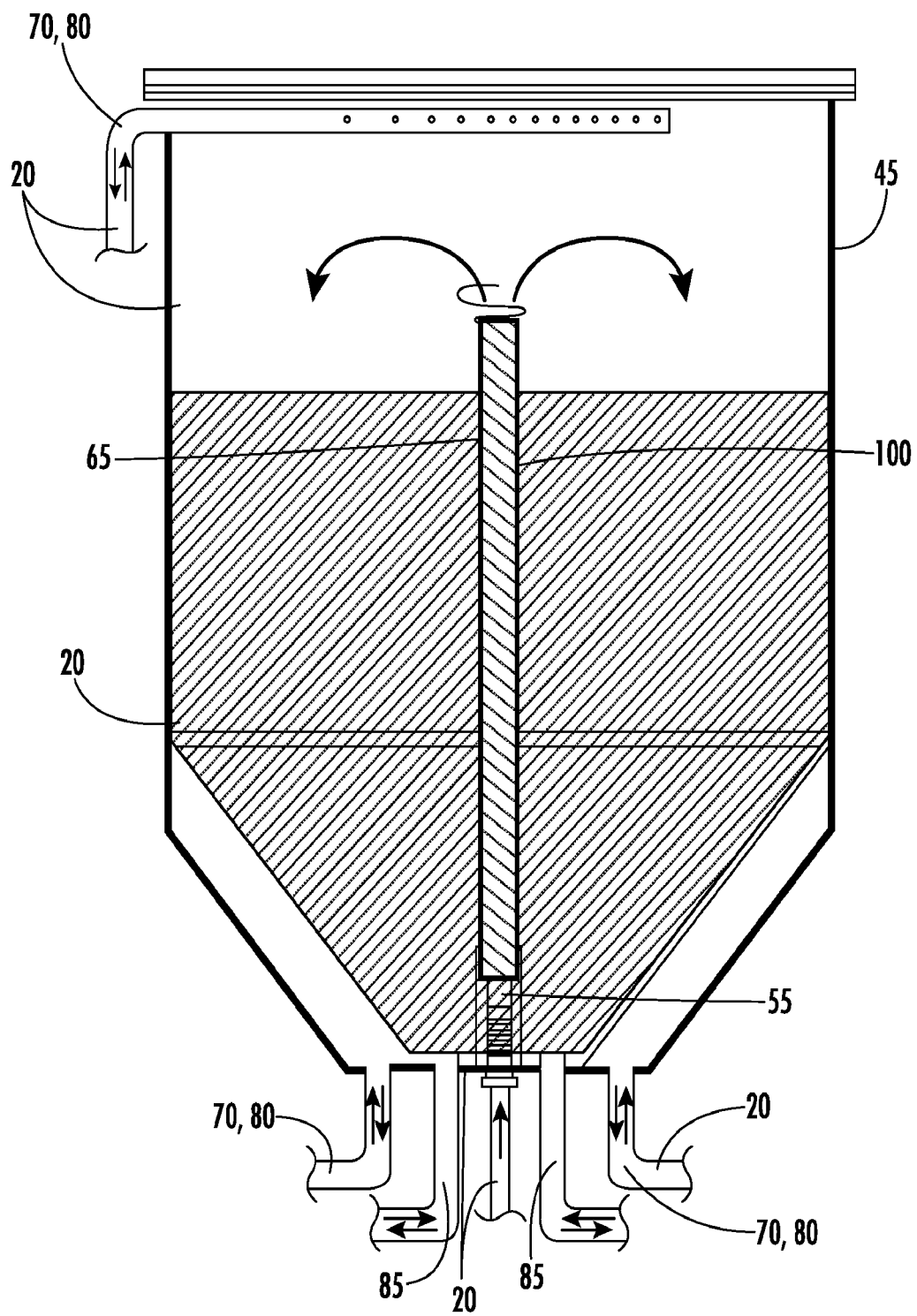
FIG. 9 is a cross-sectional view of a vertical cleaning vessel (45) having a scrubber module (100) internal to the vessel.

FIGS. 8A-C and 9 show the scrubber modules 100 contemplated herein integrated with the resin cleansing systems discussed above. Specifically, FIGS. 8A-C are top, front, and side cross-sectional views, respectively, of a non-limiting example of a vertical cleaning vessel 45 having a scrubber module 100 external to the vessel 45. FIG. 9 is a cross-sectional view of a non-limiting example of a vertical cleaning vessel 45 having a scrubber module 100 internal to the vessel 45. As shown, the system comprises a cleansing vessel as well as one or more scrubber modules 100.

Some embodiments may further comprise one or more sample ports 140 (e.g., ports for obtaining samples for validation testing, etc.), a resin trap 145 (e.g., screens to prevent the loss of resin while allowing the removal of fines, etc.), and one or more fluidizers 150 (e.g., devices that improve the efficacy of the eductors by introducing turbulence to the cleaning solution to help keep the resin suspended in the fluid rather than settling on vessel surfaces). Some embodiments may introduce rinse materials in both the middle and top of the vessel, using one or more top rinse in/waste out 155 conduits, and/or one or more mid rinse in/waste out 160 conduits, along with a plurality of side strainers.

As shown, the system contains a bottom eductor 60 for drawing the resin/solution mixture from the bottom of the vessel 45, to be passed through the scrubber module 100 and finally returned back to the top of the resin charge in the cleaning vessel 45. According to various embodiments, this flow path is recirculated until the cleaning or regeneration processes have achieved expected end-points, as described above.

Figure 5:
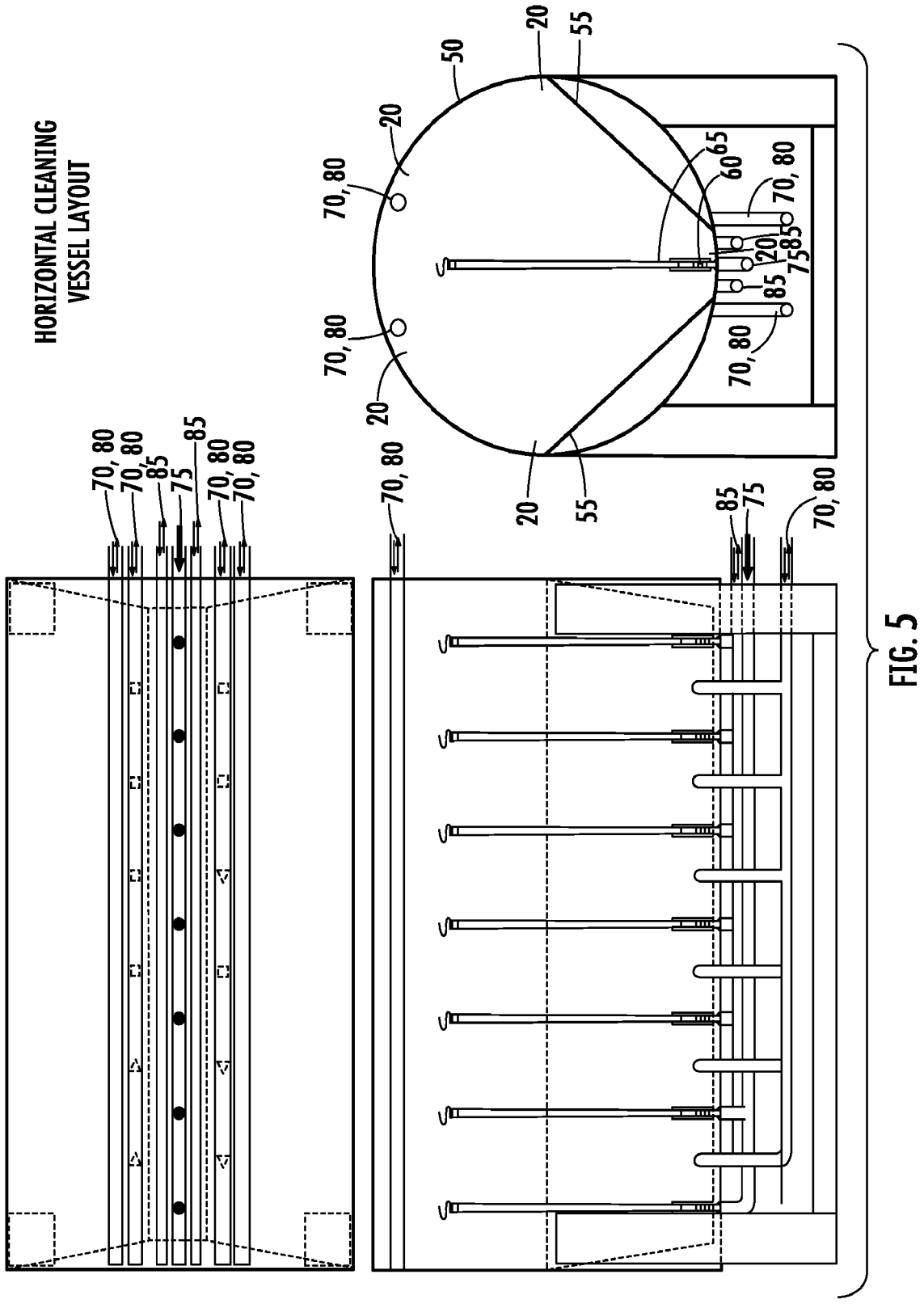
FIG. 5 shows a cross-sectional view of a suggested Horizontal Cleaning Vessel (50) employed in the method and system of the present invention.
Figure 6:
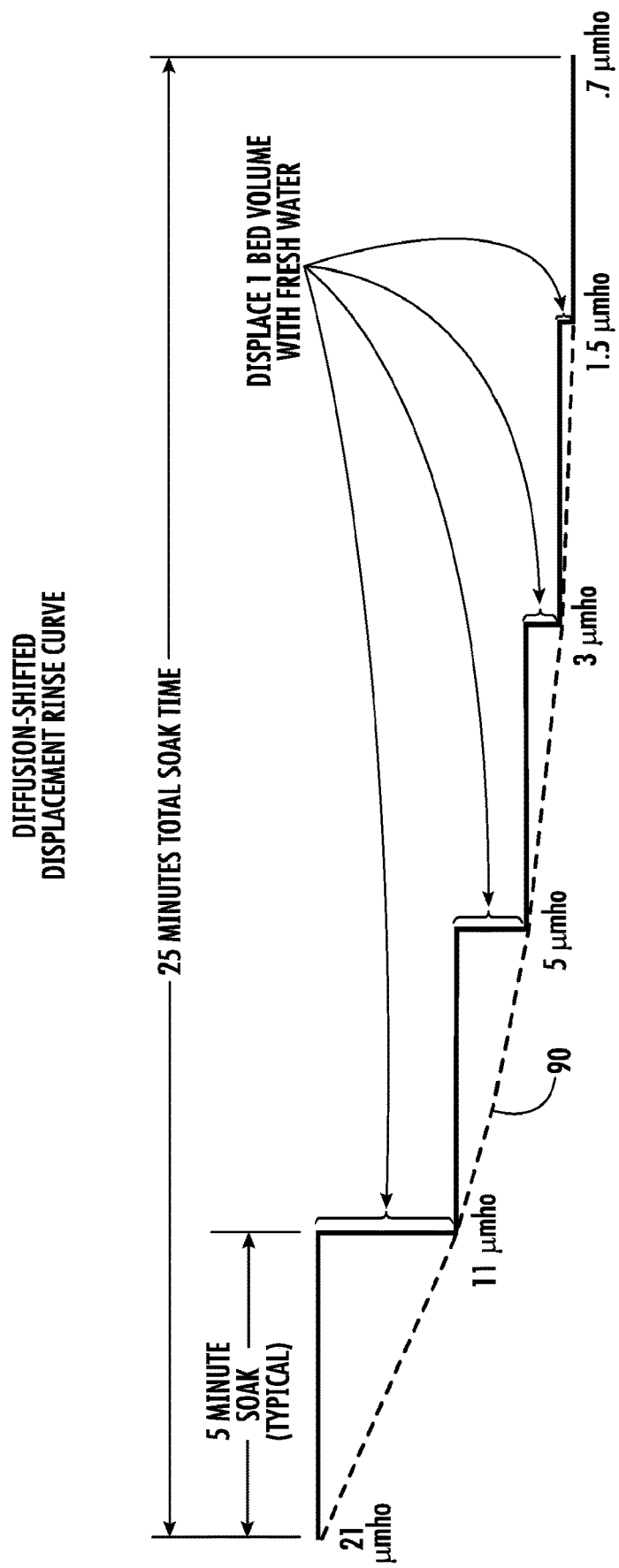
FIG. 6 illustrates a diffusion-shifted displacement (90) approach to final rinses of the method and system of the present invention.

It should be noted that while the non-limiting examples shown in FIGS. 8-9 comprise a vertical cleaning vessel 45, the scrubber module 100 may also be incorporated into a horizontal cleaning vessel 50, such as the vessel 50 shown in FIG. 5. For both types of cleaning vessels 45,50, the scrubber module 100 or modules 100 may be implemented either external to the vessel 45,50 or contained within the vessel 45,50, or both.

In some embodiments, a cleaning vessel 45,50 may employ more than one scrubber module 100. As a specific example, in an embodiment making use of the horizontal cleaning vessel 50 of FIG. 5, each plenum 65 may be its own scrubber module 100, such that any resin leaving the top of a plenum 65 has passed through a scrubber module 100. In some embodiments, the cleaning vessel 45, 50 may have one or more scrubber modules 100 both internal and external to the vessel. For example, in one embodiment, the vessel may have a plurality of plenums 65 with internal spiral flighting 185 (e.g., the scrubber module 100 of FIG. 7A) as well as one or more scrubbers with coiled pipe (e.g., the scrubber module 100 of FIG. 7B) outside the vessel. As an option, the output of the modules may be configured such that one scrubber dumps the resin output at the top of the vessel above the area where another scrubber is pulling in from the bottom of the vessel, such that the resin may travel throughout the entire vessel, both horizontal and vertical, rather than a series of localized vertical circuits.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

What is claimed is:

1. A cleaning system configured to clean and regenerate kinetic and ion exchange properties of resin, comprising: a vessel comprising a bottom, at least one solution inlet, at least one waste outlet, at least one resin inlet, and at least one resin outlet; a draw chamber disposed inside the bottom of the vessel, the draw chamber comprising a separation screen; at least one eductor; a plenum in fluid communication with the at least one eductor, discharging at a top of the vessel; a fouled or exhausted resin comprising at least one resin, each resin of the at least one resin being one of cationic and anionic in nature; a first resin regeneration chemical flowing through the at least one eductor into the vessel, wherein the first resin regeneration chemical is a chemical regeneration solution for one of cation resins and anion resins; a sulfite solution circulating through the at least one eductor into the vessel along with the fouled or exhausted resin, the sulfite solution performing a reducing reaction; and a scrubber module comprising at least three helical pathways configured to convey the resin with a velocity, each helical pathway comprising a conduit rotating about and propagating along an axis with a pitch, wherein the at least three helical pathways are coupled in series such that the bottom of the vessel is in fluid communication with the top of the vessel through all of the helical pathways, wherein each helical pathway is in fluid communication with a subsequent helical pathway; wherein the three helical pathways together comprise a pathway inlet in fluid communication with the bottom of the vessel through the eductor and a pathway outlet in fluid communication with the top of the vessel; wherein said at least one eductor are configured to recirculate resin throughout the vessel as the separation screen and the sulfite solution work together to remove at least one of organics, iron oxides, waste, and debris from the resin.

2. The system of claim 1, wherein each helical pathway of the at least three helical pathways of the scrubber module further comprises a booster eductor coupled to one of the pathway inlet and the pathway outlet of the helical pathway, and further coupled to an eductor motive feed, the booster eductor configured to draw resin through the pathway inlet, through the conduit, and out the pathway outlet toward the top of the vessel.

3. The system of claim 1, wherein the conduit of the helical pathway is formed from a spiral flighting coupled to the inside of the plenum.

4. The system of claim 1, wherein the conduit comprises a coiled pipe.

5. The system of claim 1, further comprising a plurality of scrubber modules.

6. The system of claim 1, wherein moving from the helical pathway closest to the bottom of the vessel to the helical pathway closest to the top of the vessel, a pathway radius of each helical pathway gets progressively smaller.

7. The system of claim 1, wherein at least two helical pathways have pathway radii that are substantially equal.

8. A cleaning system configured to clean and regenerate kinetic and ion exchange properties of resin, comprising: a vessel comprising a bottom, at least one solution inlet, at least one waste outlet, at least one resin inlet, and at least one resin outlet; a draw chamber disposed inside the bottom of the vessel, the draw chamber comprising a separation screen; at least one eductor; a plenum in fluid communication with the at least one eductor, discharging at a top of the vessel; a fouled or exhausted resin comprising at least one resin, each resin of the at least one resin being one of cationic and anionic in nature; a first resin regeneration chemical flowing through the at least one eductor into the vessel, wherein the first resin regeneration chemical is a chemical regeneration solution for one of cation resins and anion resins; a sulfite solution circulating through the at least one eductor into the vessel along with the fouled/exhausted resin, the sulfite solution performing a reducing reaction; and a scrubber module comprising at least one helical pathway configured to convey the resin with a velocity, the helical pathway comprising a conduit rotating about and propagating along an axis with a pitch, wherein the helical pathway comprises a pathway inlet in fluid communication with the bottom of the vessel through the eductor and a pathway outlet in fluid communication with the top of the vessel; wherein said at least one eductor are configured to recirculate resin throughout the vessel as the separation screen and the sulfite solution work together to remove at least one of organics, iron oxides, waste, and debris from the resin.

9. The system of claim 8, wherein each helical pathway of the at least one helical pathways of the scrubber module further comprises a booster eductor coupled to one of the pathway inlet and the pathway outlet of the helical pathway, and further coupled to an eductor motive feed, the booster eductor configured to draw resin through the pathway inlet, through the conduit, and out the pathway outlet toward the top of the vessel.

10. The system of claim 8, wherein the conduit of the helical pathway is formed from a spiral flighting coupled to the inside of the plenum.

11. The system of claim 8, wherein the conduit comprises a coiled pipe.

12. The system of claim 8, wherein the scrubber module comprises a plurality of helical pathways that are coupled in series such that the bottom of the vessel is in fluid communication with the top of the vessel through all of the helical pathways, wherein each helical pathway is in fluid communication with a subsequent helical pathway through a booster eductor.

13. The system of claim 8, wherein moving from the helical pathway closest to the bottom of the vessel to the helical pathway closest to the top of the vessel, a pathway radius of each helical pathway gets progressively smaller.

14. The system of claim 8, wherein at least two helical pathways have pathway radii that are substantially equal.

15. The system of claim 8, wherein the sulfite solution converts to sulfate as part of a reducing reaction to clean resins prior to an introduction of the first resin regeneration chemical.

16. The system of claim 8, wherein the sulfite solution converts to sulfate as part of a reducing reaction to clean resins prior to the introduction of a second resin regeneration chemical flowing through the at least one eductor into the vessel, wherein the second resin regeneration chemical is a chemical regeneration solution for one of cation resins and anion resins.

17. The system of claim 8, wherein the sulfite solution is catalyzed and configured to deconstruct and remove organic and metal oxide materials adhered to resin surfaces.

18. The system of claim 8, wherein the scrubber module is located outside of the vessel.

19. The system of claim 8, wherein the at least one eductor is disposed internally to the vessel.

20. The system of claim 8, wherein the vessel is configured to be at least one of sealed, pressurized, and filled with at least one of water and sulfite solution, to prevent introduction of free oxygen to the vessel.

* * * * *